A. G. FELKER.
MEANS FOR JOINING CULVERT SECTIONS.
APPLICATION FILED OCT. 14, 1911.
1,016,878.
Patented Feb. 6, 1912.
2 SHEETS—SHEET 1.
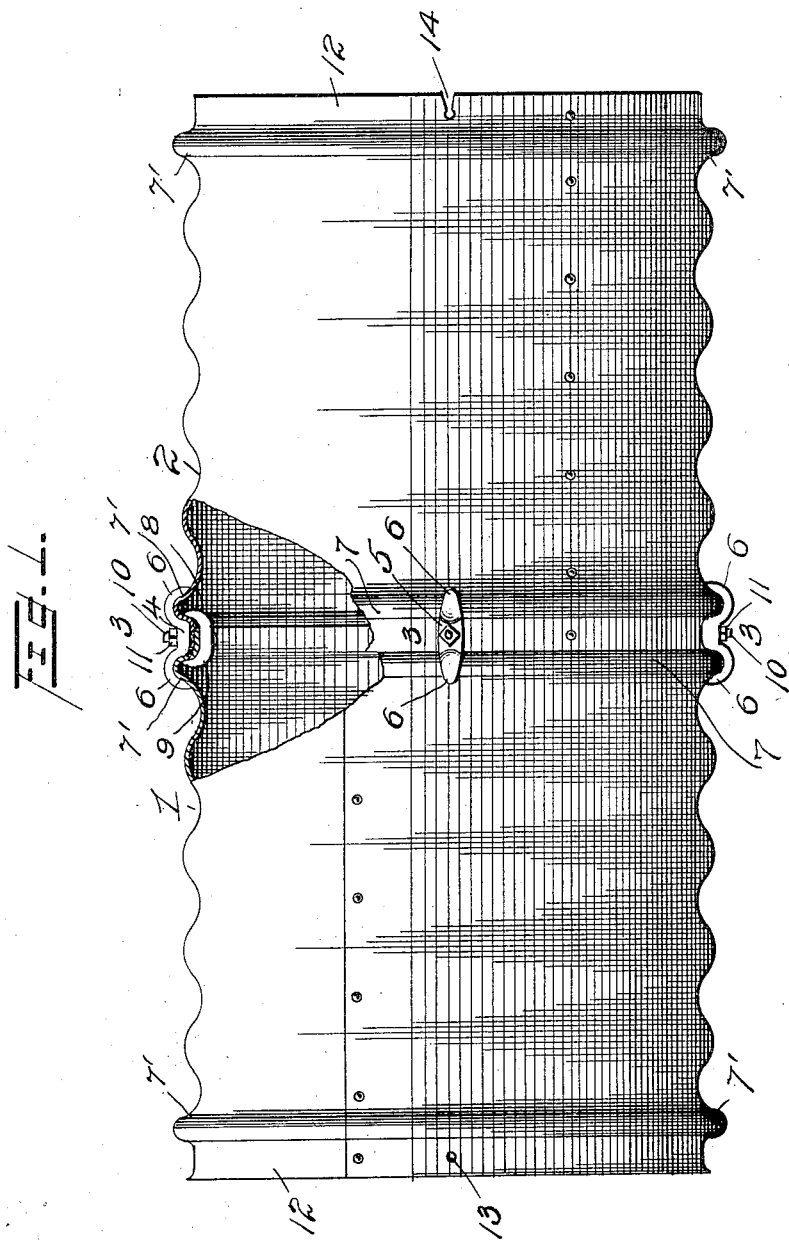

A. G. FELKER.
MEANS FOR JOINING CULVERT SECTIONS.
APPLICATION FILED OCT. 14, 1911.
1,016,878.
Patented Feb. 6, 1912.
2 SHEETS—SHEET 2.
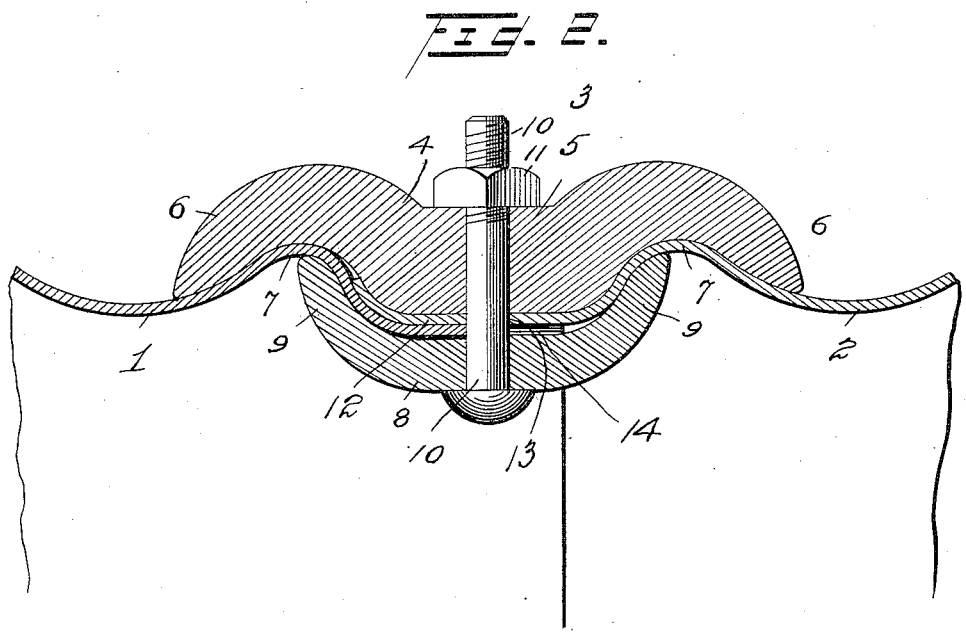
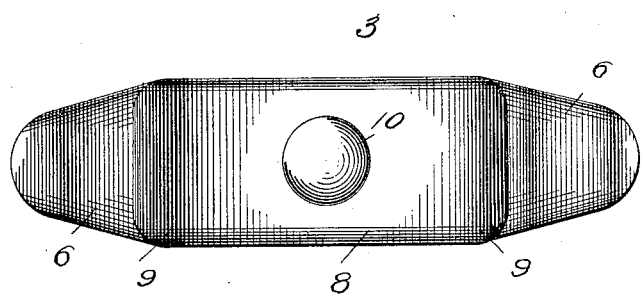
Witnesses
Inventor
A. G. Felker
By
Attorney

UNITED STATES PATENT OFFICE.

ALBERT G. FELKER, OF MARSHFIELD, WISCONSIN.

MEANS FOR JOINING CULVERT-SECTIONS.

1,016,878.  Specification of Letters Patent.  Patented Feb. 6, 1912.

Application filed October 14, 1911. Serial No. 654,767.

*To all whom it may concern:*

Be it known that I, ALBERT G. FELKER, a citizen of the United States, residing at Marshfield, in the county of Wood and State of Wisconsin, have invented certain new and useful Improvements in Means for Joining Culvert-Sections, of which the following is a specification.

This invention relates to a certain new and improved means of joining culverts and consists in the novel features of construction, combination and arrangement of parts illustrated in the drawings and more particularly pointed out in the appended claims.

For a complete description of my improvements, reference may be had to the accompanying specification and drawings, in which, Figure 1 is a sectional elevation, showing my improved method of joining culvert sections. Fig. 2 is a fragmentary sectional view and Fig. 3 a detail plan view of the clamp.

Referring to the drawings, 1 and 2 indicate two connected culvert sections and 3 the clamps. Each clamp consists of an outer clip 4 consisting of the flat central body portion and the inwardly curved end portions or wings 6 which conform to and snugly receive the special high corrugations 7, formed at opposite ends of the culvert sections. Each clamp further comprises an inner clip 8 provided with the outwardly curved end portions or wings 9 which engage the inner walls of the corrugations 7 of the culvert sections. The outer and inner clips are connected together and clamped against opposite faces or walls of the culvert sections by the bolts 10 and the nuts 11 screwing on the threaded ends of the bolts. An adjoining pair of culvert sections are joined together by a series of clamps, as shown, which are equally spaced around the circumference thereof. The bolts pass through the apertures 13 in the end of one section and through registering slots 14 in the adjacent end of the other section. This makes possible the assembling of the sections with the work executed from the outside.

Much importance is attached to the method of forming the sections, that is, with special high corrugations 7 with abnormally high and steep slopes $7^1$ to receive corresponding surfaces of the metal clamps. The corrugations 7 are in actual practice about forty per cent. higher than the intermediate ones, which not only facilitates the joining of the sections by the clamps but greatly re-inforces the ends of the sections, making them more rigid and better able to withstand transportation and strains when in actual service.

Obviously the weak point of all culverts when under strain, such as earth pressure caused by heavy traffic, is at the point where the sections are joined together. Practice has proved that when sufficient pressure is brought to bear upon a culvert, it invariably gives away at points of intersection of the sections, the male end of a section going down first. This I overcome by employing the special high corrugations at the ends of the sections, as above specified. It is to be understood that all sections used in one continuous piping are to be constructed with the corrugations 7.

From the foregoing description taken in connection with the drawings, it is thought that the construction and advantages of this invention will be readily understood without requiring a more extended explanation.

Various changes in the form, proportions and minor details of construction may be resorted to without departing from the principles or sacrificing any of the advantages of this invention as defined in the appended claims.

Having described my invention, what I claim as new and desire to secure by Letters Patent, is:—

1. Means of joining culvert sections comprising a series of circumferentially spaced clamps arranged at the meeting ends of the sections, each clamp consisting of an outer and an inner clip with oppositely curved portions adapted to fit corresponding portions of the sections.

2. Means of joining culvert sections comprising a series of clamps arranged at the meeting ends of the sections, each clamp consisting of an outer and an inner clip provided with oppositely curved portions adapted to fit corresponding portions of the sections and means for securing the clamps in place consisting of bolts and nuts.

3. Means of joining culvert sections consisting of sections having at their ends special high corrugations with abnormally steep slopes, and a series of clamps arranged at the meeting ends of adjacent sections for joining the sections together, each clamp comprising an outer and an inner clip formed with oppositely curved portions, adapted to engage the outer and inner walls, respectively, of the corrugations above referred to, connecting bolts passing through the clamps and the ends of the culvert sections and nuts screwing on the outer threaded ends of the bolts.

In testimony whereof I affix my signature in presence of two witnesses.

ALBERT G. FELKER.

Witnesses:
 AMOS ROLL,
 J. H. CONLEY.

Copies of this patent may be obtained for five cents each, by addressing the "Commissioner of Patents, Washington, D. C."